(12) United States Patent
Ban et al.

(10) Patent No.: US 9,712,432 B2
(45) Date of Patent: Jul. 18, 2017

(54) LIGHT-WEIGHT FORK CHANNELS FOR CLUSTERING

(71) Applicant: Red Hat, Inc., Raleigh, NC (US)

(72) Inventors: Bela Ban, Kreuzlingen (CH); Sanne Grinovero, London (GB)

(73) Assignee: Red Hat, Inc., Raleigh, NC (US)

( * ) Notice: Subject to any disclaimer, the term of this patent is extended or adjusted under 35 U.S.C. 154(b) by 384 days.

(21) Appl. No.: 14/464,871

(22) Filed: Aug. 21, 2014

(65) Prior Publication Data

US 2016/0057053 A1  Feb. 25, 2016

(51) Int. Cl.
| | |
|---|---|
| G06F 15/16 | (2006.01) |
| H04L 12/16 | (2006.01) |
| H04W 4/00 | (2009.01) |
| H04L 12/715 | (2013.01) |
| H04L 12/58 | (2006.01) |
| H04L 12/707 | (2013.01) |
| H04L 12/761 | (2013.01) |
| G06F 12/00 | (2006.01) |

(52) U.S. Cl.
CPC .............. *H04L 45/46* (2013.01); *G06F 12/00* (2013.01); *H04L 45/16* (2013.01); *H04L 45/24* (2013.01); *H04L 51/28* (2013.01)

(58) Field of Classification Search
CPC ... G06Q 10/107; H04L 47/10; H04L 12/5695; H04L 47/15; H04L 47/2441; H04L 29/06; H04L 12/585; H04L 12/58; H04L 12/581; H04L 12/5855; H04W 80/04; H04W 88/06; H04W 88/08; H04W 84/18; H04Q 11/0478

USPC ....................................................... 709/206
See application file for complete search history.

(56) References Cited

U.S. PATENT DOCUMENTS

| | | | | |
|---|---|---|---|---|
| 2002/0012328 | A1* | 1/2002 | Emanuel | H04L 29/12216 370/328 |
| 2006/0120283 | A1* | 6/2006 | Poetker | H04L 29/06027 370/230 |
| 2013/0045684 | A1* | 2/2013 | Linde | H04W 80/02 455/41.2 |
| 2013/0188758 | A1* | 7/2013 | Zopf | H04L 1/22 375/343 |

(Continued)

OTHER PUBLICATIONS

JGroup Fork : cactus stacks, by Bela Ban, published on Aug. 20, 2013. You can access the page https://issues.jboss.org/browse/JGRP-1613.*

(Continued)

*Primary Examiner* — Mahran Abu Roumi
(74) *Attorney, Agent, or Firm* — Lowenstein Sandler LLP (57) ABSTRACT

A method for light-weight fork channels for clustering is disclosed. The method includes receiving, by a processing device, a message at a main channel used for group communication between processes executed by the processing device, identifying a fork channel identifier (ID) and a fork stack ID in a header of the message, processing the message with a fork stack corresponding to the fork stack ID in the header of the message, the fork stack comprising a subset of protocols of a main protocol stack of the main channel, and providing the message to a fork channel corresponding to the fork channel ID, wherein the fork channel to utilize the fork stack to separate messages for the fork channel from the main channel.

18 Claims, 7 Drawing Sheets

(56) References Cited

U.S. PATENT DOCUMENTS

2016/0219133 A1* 7/2016 Kwon ................ H04L 65/4076

OTHER PUBLICATIONS

Ban, Bela, Grinovero, Sanne, "JGroups", GitHub, https://github.com/belaban/JGroups/blob/master/doc/design/FORK.txt, Aug. 20, 2013, 3 pages.

Ban, Bela, Chapter 3. API, "Reliable group communication with JGroups 3.x", http://www.jgroups.org/manual/html/user-advanced.html#SharedTransport, Dec. 3, 2007, 22 pages.

Ban, Bela, "How to hijack a JGroups channel inside Infinispan/JBoss . . . (and get away with it!)", Belas Blog, Aug. 21, 2013, http://belaban.blogspot.ch/2013/08/how-to-hijack-jgroups-channel-inside.html, 4 pages.

Ban, Bela, Grinovero, Sanne, "5.19 ForkChannels: light-weight channels to piggy-back messages over an existing channel", Reliable group communication with JGroups 3.x, http://www.jgroups.org/manual/index.html#ForkChannel, as last modified Aug. 21, 2013, 3 pages [retrieved on Feb. 7, 2017].

Ban, Bela, Grinovero, Sanne, "5.19.1 Configuration", Reliable group communication with JGroups 3.x, http://www.jgroups.org/manual/index.html#ForkChannelConfig, as last modified Aug. 21, 2013, 2 pages [retrieved on Feb. 7, 2017].

Ban, Bela, Grinovero, Sanne, "5.19.2 Creation of fork channels ", Reliable group communication with JGroups 3.x, http://www.jgroups.org/manual/index.html#ForkChannelCreation, as last modified Aug. 21, 2013, 2 pages [retrieved on Feb. 7, 2017].

* cited by examiner

FIGURE 6

LIGHT-WEIGHT FORK CHANNELS FOR CLUSTERING

TECHNICAL FIELD

The implementations of the disclosure relate generally to group communication and, more specifically, relate to light-weight fork channels for clustering.

BACKGROUND

In the current computing paradigm, an application developer may create an application that utilizes multiple network stacks. In such a scenario, the application developer may implement a protocol designed for reliable multicast communications. The multicast protocol may be used to create groups of processes whose members can reliably-send messages to each other. The multicast protocol may be responsible for group creation and deletion, joining and leaving groups, membership detection and notification, detection and removal of crashed members, sending and receiving of member-to-group messages (point-to-multipoint), and sending and receiving of member-to-member message (point-to-point), for example.

In one example, an application server may implement a group communication protocol. An application server may generally refer to a program, or hardware implementation of the program, in an intranet or Internet environment that hosts a variety of language systems used to query databases and/or perform general business processing. Application servers may utilize multicast protocol to communicate messages between members forming a group in the application server. The members may be processes, objects, or other entity that can send and receive messages to or from the group. For example, a member may be an application instance hosted by the application server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide for light-weight fork channels for clustering. In one implementation, a fork protocol for group members that communicate using channels is provided. In one implementation, the group members are part of a computer cluster (e.g., group of computing processes). The fork protocol can enable multiple light-weight channels (referred to herein as "fork channels") to piggyback messages on an existing channel. Furthermore, the fork protocol can be used to add protocols to an existing channel that are to be used by the light-weight fork channel exclusively. An application developer may prefer to add such a protocol to the dedicated light-weight fork-channel so as not to interfere with the configuration of other light-weight fork channel users, or to isolate the light-weight fork channel from other instances of the same protocol as well as from users of the main channel.

The fork channels of implementations of the disclosure allow an application to reuse an existing channel (referred to herein as the "main channel") (e.g. the default channel created inside the application server), without having to configure and create an entirely new channel. Creating a new channel is considered a heavy-weight task (as it duplicates resources, introduces new ports to maintain, etc.). The new fork channel is shielded from messages passing up and down the main channel. Similarly, the main channel is shielded from message traffic from the fork channel. The creation of the new fork channel may be accomplished without modifying the configuration of the main channel.

In addition, the fork channels of implementations of the disclosure allow an application developer to add specialized protocols to a fork protocol stack of the fork channel that are not found in the main protocol stack of the main channel. For example, if an application uses a distributed atomic counter, it can create a fork stack with a COUNTER protocol (e.g., a protocol providing the distributed atomic counter) and connect a fork channel to that fork stack. As a result, the application has distributed atomic counter capabilities on the fork stack of its form channel, which were not available in the main protocol stack of the main channel.

Figure 1:
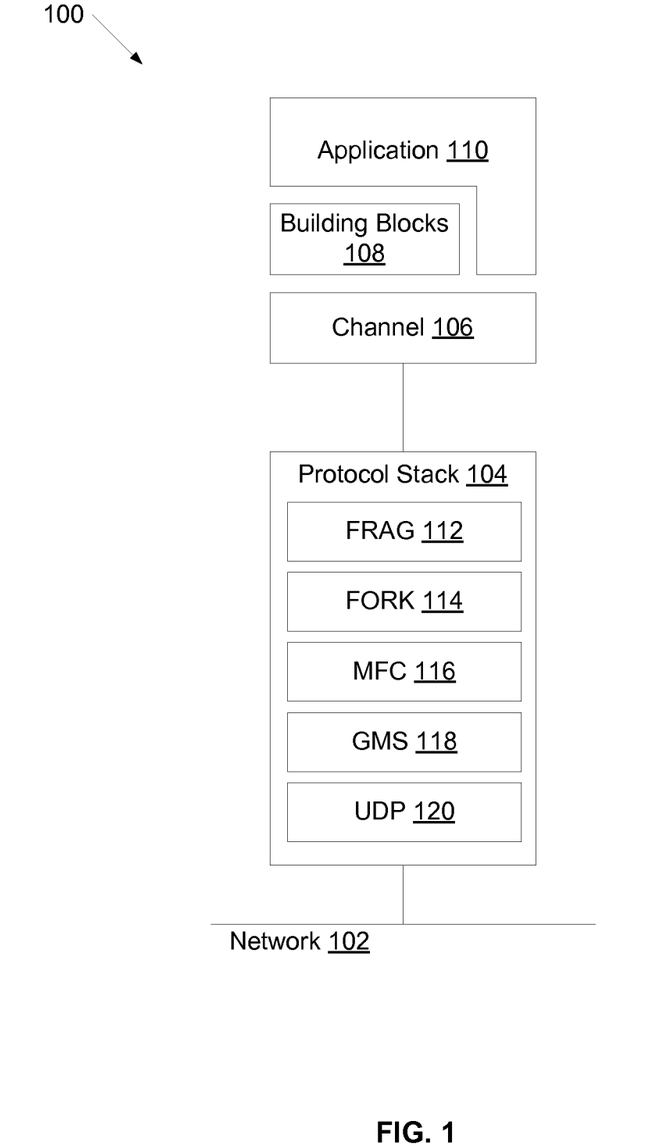
FIG. 1 is a block diagram of an exemplary network architecture of a group communication system in which implementations of the disclosure may operate.

FIG. 1 illustrates an exemplary network architecture of a group communication system 100 in which implementations of the present invention may operate. In one implementation, system 100 may be part of an application server executed by a computing device, such as a server device or any other type of computing device. Processes can join a group, send messages to all members or single members and receive messages from members in the group. The system 100 keeps track of the members in every group, and notifies group members when a new member joins, or an existing member leaves or crashes. A group is identified by its name. Groups do not have to be created explicitly; when a process joins a non-existing group, that group will be created automatically. Member processes of a group can be located on the same host, within the same local area network (LAN), or across a wide area network (WAN). A member can be part of multiple groups.

The group communication architecture may comprise three parts: (1) a channel layer 106 used by application developers to build reliable group communication applications, (2) building blocks 108, which are layered on top of channel 106 and provide a higher abstraction level and (3) a protocol stack 104, which implements the properties specified for a given channel.

Channel 106 is connected to protocol stack 104. Whenever an application sends a message, channel 106 passes it on to protocol stack 104 comprising several protocols 112, 114, 116, 118, 120. The topmost protocol processes the message and the passes it on to the protocol below it. Thus, the message is handed from protocol to protocol until the bottom protocol puts it on the network 102. The same happens in the reverse direction: the bottom (transport) protocol listens for messages on network 102. When a message is received, it is passed up the protocol stack 104 until it reaches channel 106. Channel 106 stores the message in a queue until application 110 consumes it.

When an application 110 connects to a channel 106, protocol stack 106 is started, and when it disconnects protocol stack 104 is stopped. When the channel 106 is closed, the stack 140 is destroyed, releasing its resources.

To join a group and send messages, a process creates a channel 106 and connects to the channel 106 using the group name. All channels with the same name form a group. The channel is the handle to the group. While connected, a member may send and receive messages to and/or from all other group members. A member may refer to an application, an application instance, a process, an object, or any other type of entity using group communication. The member leaves a group by disconnecting from the channel. A channel can be reused so that members can connect to it again after having disconnected. However, a channel may allow only one member to be connected at a time. If multiple groups are to be joined, multiple channels can be created and connected to. A member signals that it no longer wants to use a channel by closing it. After this operation, the channel may not be used any longer.

Each channel has a unique address. Channels know who the other members are in the same group: a list of member addresses can be retrieved from any channel. This list is called a View. A member can select an address from this list and send a unicast message to it (also to itself), or it may send a multicast message to all members of the current view. Whenever a member joins or leaves a group, or when a crashed member has been detected, a new view is sent to all remaining group members. When a member is suspected of having crashed, a suspicion message is received by all non-faulty members. Thus, channels receive regular messages, view messages and suspicion messages. A member may choose to turn reception of views and suspicions on/off on a channel basis.

A channel may be implemented over a number of alternatives for group transport. For example, a channel may be implemented as the abstract class, Channel, and concrete implementations are derived from it, e.g. a Channel implementation using its own protocol stack, or others using existing group transports. Applications deal with the abstract Channel class, and the actual implementation can be chosen at startup time.

The properties for a channel may be specified in a colon-delimited string format. When creating a channel, a protocol stack is created according to these properties. All messages pass through this stack, ensuring the quality of service specified by the properties string for a given channel.

Channels are a simple and primitive design. They offer the bare functionality of group communication, and have been designed after the model of BSD sockets. The reason is that an application can make use of the small subset of classes, without having to include a whole set of sophisticated classes that the application may not even need. Also, a somewhat minimalistic interface of the channel is simple to understand. A member utilizes approximately 12 methods to be able to create and use a channel (and oftentimes uses 3-4 methods frequently).

Channels provide asynchronous message sending/reception, somewhat similar to User Datagram Protocol (UDP). A message sent is put on the network and the send( ) method returns immediately. Conceptual requests, or responses to previous requests, are received in undefined order, and the application has to take care of matching responses with requests.

The presently described group architecture offers building blocks 108, as illustrated in FIG. 1, that provide more sophisticated Application Programming Interface (APIs) on top of a channel 106. Building blocks 108 either create and use channels 106 internally, or require an existing channel 106 to be specified when creating a building block 108. Applications communicate directly with the building block 108, rather than the channel 106. Building blocks 108 are intended to save the application developer from having to write tedious and recurring code, e.g. request-response correlation.

Protocol stack 104 (also referred to herein as "stack"), as illustrated in FIG. 1, includes the following protocols: Fragmentation (FRAG) 112, FORK 114, Multicast Flow Control (MFC) 116, Group Membership (GMS) 118, and UDP 120. All messages sent and received over the channel have to pass through the protocol stack. Every layer may modify, reorder, pass or drop a message, or add a header to a message. A fragmentation layer (e.g., FRAG 112) might break up a message into several smaller messages, adding a header with an identifier (ID) to each fragment, and re-assemble the fragments on the receiver's side.

The composition of the protocol stack 104, i.e. its layers, is determined by the creator of the channel. In one implementation, a property string may be used to define the layers to be used (and the parameters for each layer). This string might be interpreted differently by each channel implementation. It is used to create the stack 104, depending on the protocol names given in the property. In other implementations, extensible markup language (XML) configuration or programmatic configuration may be utilized to compose the protocol stack 104.

Knowledge about the protocol stack 104 is not necessary when using channels 106 in an application. However, when an application wishes to ignore the default properties for a protocol stack 104, and configure its own stack 104, then knowledge about what the individual layers are supposed to do should be acquired.

Figure 2:
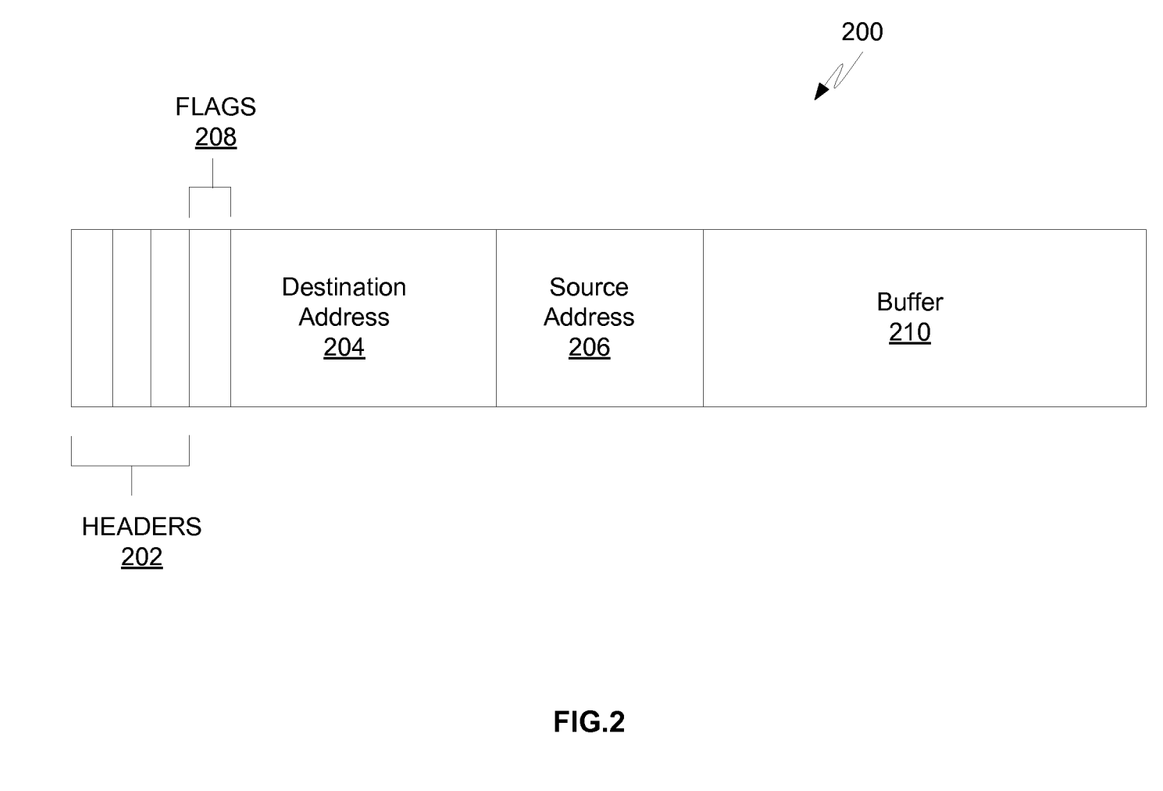
FIG. 2 is a block diagram of a structure of a message according to an implementation of the disclosure.

Data is sent between members in the form of messages. A message can be sent by a member to a single member, or to all members of the group of which the channel is an endpoint. An example of a structure of a message 200 is illustrated in FIG. 2.

The message 200 may contain five fields: headers 202, destination address 204, source address 206, flags 208, and payload 210.

A list of headers 202 can be attached to a message. Anything that should not be in the payload 210 can be attached to message 200 as a header. Methods putHeader( ), getHeader( ), and removeHeader( ) of message 200 can be used to manipulate headers 202.

The destination address 204 may include the address of the receiver. If null, the message will be sent to all current group members.

The source address 206 may include the address of a sender. It can be left null, and will be filled in by the transport protocol (e.g. UDP) before the message is put on the network 102.

One byte of the message 200 may be used for flags 208. Examples of flags may be OOB, LOW_PRIO and HIGH_PRIO.

The payload 210 may include the actual data (as a byte buffer). The message class contains convenience methods to set a serializable object and to retrieve it again, using serialization to convert the object to/from a byte buffer.

The message 200 may be similar to an IP packet and consists of the payload (a byte buffer) and the addresses of the sender and receiver (as addresses). Any message put on the network 102 can be routed to its destination (receiver address), and replies can be returned to the sender's address.

A message may not have to fill in the sender's address when sending a message. This may be done automatically by the protocol stack 104 before a message is put on the network 102. However, there may be cases, when the sender of a message wants to give an address different from its own, so that for example, a response should be returned to some other member.

The destination address (receiver) can be an Address, denoting the address of a member, determined e.g. from a message received previously, or it can be null, which means that the message will be sent to all members of the group. A typical multicast message, sending string "Hello" to all members may appear as follows:
Message msg=new Message(null, null, "Hello".getBytes( )); channel.send(msg);

Implementations of the disclosure provide a fork protocol for group communications using channels 106. The purpose of the fork protocol is (1) to enable multiple light-weight channels (referred to herein as "fork channels") to piggyback messages on an existing channel, and (2) to add protocols to an existing channel that are to be used by the light-weight fork-channel. An application developer may prefer to add a protocol to the dedicated light-weight fork channel so as not to interfere with the configuration of other light-weight fork-channel users, or to isolate the light-weight fork channel from other instances of the same protocol.

The fork channels of implementations of the disclosure allow an application to reuse an existing channel (referred to herein as the "main channel") (e.g. the default channel created inside the application server), without having to configure and create an entirely new channel. Creating a new channel is considered a heavy-weight task (as it duplicates resources, introduces new ports to maintain, etc.). The new fork channel is shielded from messages passing up and down the main channel. The creation of the new fork channel may be accomplished without modifying the configuration of the main channel.

In addition, the fork channels of implementations of the disclosure allow an application developer to add specialized protocols to a fork protocol stack of the fork channel that are not found in the protocol stack of the main channel. For example, if an application uses a distributed atomic counter, it can create a fork stack with a COUNTER protocol (providing the distributed atomic counter) and connect a fork channel to that fork stack. As a result, the application has distributed atomic counter capabilities on its fork stack of its form channel, which were not available in the main protocol stack of the main channel.

Figure 3:
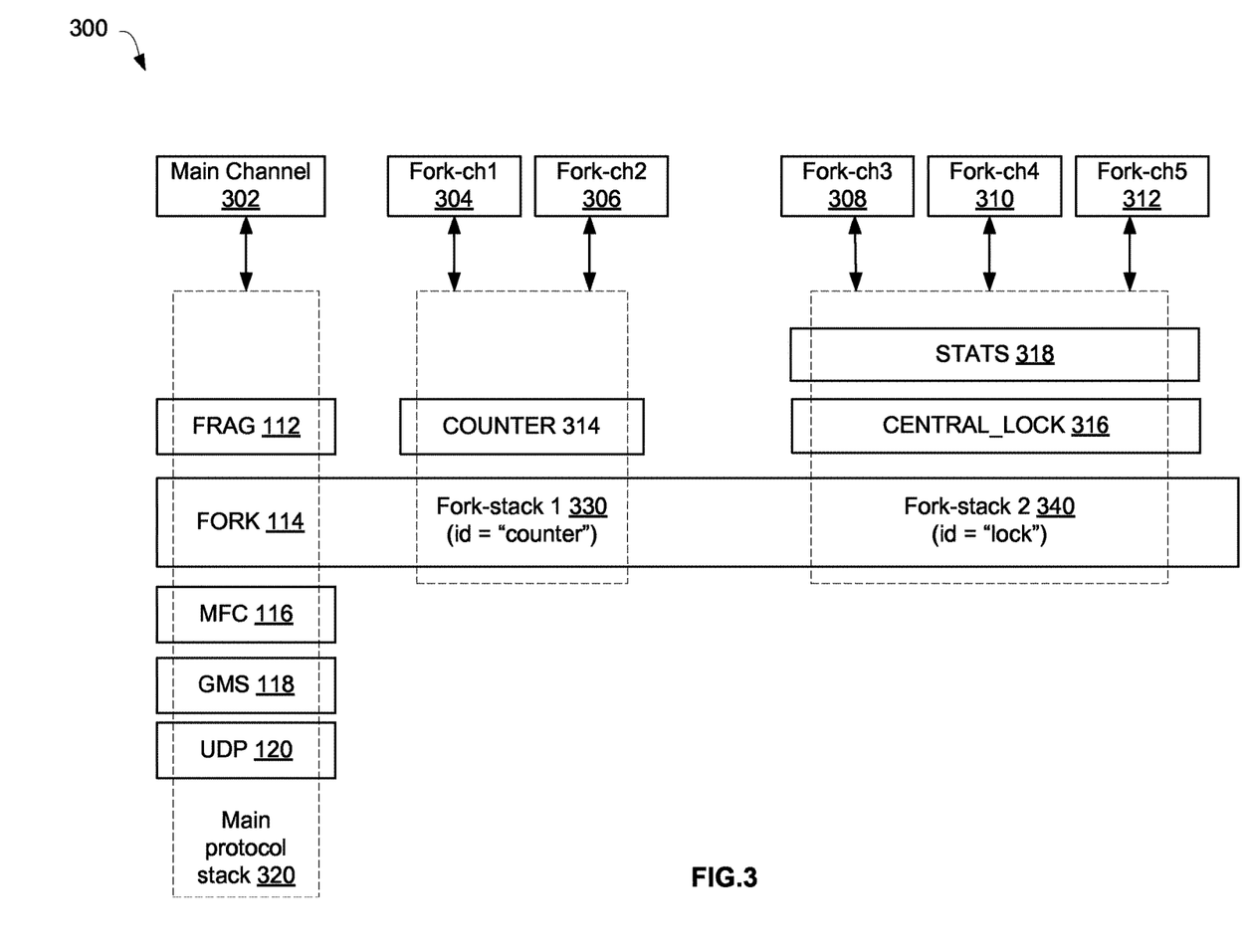
FIG. 3 is a block diagram of fork channels created using a fork protocol in a virtual machine according to an implementation of the disclosure.

FIG. 3 is a block diagram illustrating one implementation of fork channels created using a fork protocol for group members in a virtual machine 300. In one implementation, a main channel 302 and five fork channels 304, 306, 308, 310, 312 are all running in the same virtual machine (VM), which may be a process virtual machine, such as a Java™ virtual machine (JVM). The main channel 302 is connected to a main protocol stack 320, which is the default stack provided by the VM 300 for group communications. The main protocol stack 320 may include a variety of different protocols. As shown, main protocol stack 320 includes the FRAG 112, FORK 114, MFC 116, GMS 118, and UDP 120 protocols. These protocols 112-120 may be the same as the protocols 112-120 from the protocol stack 104 described with respect to FIG. 1.

In order to create fork channels 304-312, the fork protocol 114 should be present in the main stack 320. As shown, the fork protocol 114 of the main stack 320 contains two fork stacks 330, 340. A "fork stack" refers to the protocol stack of a fork channel. As shown, fork stack 1 330 includes a counter protocol 314, and fork stack 2 340 includes a lock protocol 316 and stats protocol 318. Each fork stack 330, 340 is assigned a fork stack ID that is used when creating the fork channels 304-312 to determine whether the fork channels 304-312 share the same fork stack 330, 340, or not.

Fork stack 1 330 is identified by fork stack ID "counter". The counter protocol 314 adds protocol COUNTER to the protocols provided by the main stack 320. As a result, a message passing down through fork stack 1 330 with ID "counter" passes through protocols COUNTER 314, FORK 114, MFC 116, GMS 118, and UDP 120.

In addition, each of the fork channels 304-312 is associated with a fork channel ID (e.g. "fork-ch1", "fork-ch2", and so on). The combination of fork stack ID and fork channel ID may be used to de-multiplex incoming messages. For example, if fork channel 2 306 sends a message, it'll pass through COUNTER 314 and into FORK 114. There, a header is added to the message, containing fork channel ID="fork-ch2" and fork stack ID="counter". The message is then passed down the main stack 320, through MFC 116, GMS 118, UDP 120, and so on. In one implementation, messages sent down the main stack 320 from main channel 302 do not have a header.

When a message is received, it is processed in the reverse order: first UDP 120, then GMS 118, then MFC 116, then by FORK 114. If there is no header on the message, FORK 114 passes the message up the main stack 320, where it passes through FRAG 112 and ends up in the main channel 302. If a header is present, the fork stack ID (e.g., "counter") is used to find the correct fork-stack 330, 340. If no fork stack 330, 340 is found, a warning message is logged. The message then passes through COUNTER 314 (e.g., when the fork stack ID="counter" in the message header).

Finally, the fork channel ID (e.g., "fork-ch2") is used to find the destination fork channel 304-312 and the message is passed to fork-ch2 306. In some implementations, there is a mapping between fork-channel IDs and fork channels 304-312 in the fork protocol 114 that is used for the dispatching of messages to the correct fork channel 304-312.

In implementations of the disclosure, a fork stack 330, 340 may have more than one protocol. For example, fork stack 2 340 is illustrated as including two additional protocols: CENTRAL_LOCK 316 and STATS 318. A fork stack 330, 340 can also have zero protocols. In that case, the fork stack 330, 340 it is used as a private channel for communication, and no additional protocols are utilized on top of the main stack 320.

In some implementations, fork channels 304-312 sharing the same fork stack 330, 340 also share state. For example, fork-ch1 304 and fork-ch2 306 share COUNTER 314 of fork stack 1 330, which means the fork channels 304, 306 see each other's increments and decrements of the same counter. If fork stack 2 340 ("lock") also had a COUNTER protocol (not shown), and fork-ch1 304 and fork-ch4 310 accessed a counter with the same name, then these two fork channels 304, 310 would not see each other's changes (i.e., state), as they would be utilizing two different COUNTER protocol instances.

A fork channel 304-312 may be created by using a number of different techniques, as detailed below. The techniques described below can be invoked programmatically, or can be configured declaratively (e.g., via Extensible Markup Language (XML)) as described further below.

A first example technique for creating a fork channel 304-312 is utilized when the fork-stack 330, 340 with a given ID (e.g., "Fork-ch2") already exists. In this case, a new fork-channel 304-312 is created and inserted into the map of the fork channel's protocol stack 330, 340. If a fork channel 304-312 with the given ID already exists, an exception can be thrown or the already-existing channel can be returned.

In one implementation utilizing a JVM and the JGroups™ group communication protocol, a fork channel is created as per the above technique by instantiating a new ForkChannel object as shown below:
(1) JChannel main_ch=new JChannel("/home/bela/udp.xml").name("A");
(2) ForkChannel fork_ch=new ForkChannel(main_ch, "lock", "fork-ch4", new CENTRAL_LOCK ( ) new STATS( ));
(3) fork_ch.connect("bla");
(4) main_ch.connect("cluster");

In the above JVM example, the main channel is created first at (1). Note that "udp.xml" may or may not contain FORK, but for this example it is assumed to be present. Then, at (2), the ForkChannel is created. The ForkChannel is passed the main channel, the fork stack ID ("lock"), and the fork channel ID ("fork-ch4"), plus a list of already instantiated protocols (CENTRAL_LOCK and STATS). As discussed above, if FORK already contains a fork stack with ID="lock", the existing fork stack is used, or else a new one is created with protocols CENTRAL_LOCK and STATS. A new fork channel with ID="fork-ch4" is added to the top of fork stack "lock". An exception is thrown if a fork channel with the same ID already exists.

Then, at (3), the ForkChannel calls connect( ) but the cluster name is ignored as fork channels have the same cluster name as the main channel they reference. The local address, name, view and state are also the same. This means, that even though connect( ) was called, the fork channel is not yet connected. As soon as the main channel is connected at (4), the fork channel is connected too.

A second example technique for creating a fork channel 304-312 is utilized when the fork stack 330, 340 with the given ID (e.g., "Fork-ch2") does not exist, but the fork protocol 114 is present in the main protocol stack 320 of the main channel 302. In this case, the fork stack 330, 340 is created and added to the map in the fork protocol 114, keyed by the new fork stack ID. Then, a new fork channel 304-312 may be created as described above.

A further example technique for creating a fork channel 304-312 is utilized when the fork protocol 114 does not exist in the main protocol stack 320 of the main channel 302. In this case, the fork protocol 114 is created and inserted into the main protocol stack 320 of main channel 302. To do this, the location in the main protocol stack 320 where the newly-created fork protocol layer should be inserted is determined. In addition, a configuration fragment (i.e., XML) may be passed to the create call used to generate the fork protocol layer. Once the fork protocol layer 114 is added to the main protocol stack 320, a new fork stack 330, 340 and new fork channel 304-312 may be created as described above.

In the above example utilizing a JVM and the JGroups™ group communication protocol, a simplified constructor is utilized that relies on the fork protocol being present in the main protocol stack 320 or the fork protocol stack 330, 340. In the JVM and JGroups™ context, there also is a constructor that allows for the fork protocol to be created dynamically if not present, as described below:

```
public ForkChannel(final Channel main_channel,
    String fork_stack_id, String fork_channel_id,
    boolean create_fork_if_absent,
    int position, Class<? extends Protocol> neighbor,
    Protocol . . . protocols) throws Exception;
```

In the above example, in addition to passing the main channel, the fork stack and channel IDs, and the list of protocols, this constructor also allows a user to create the fork protocol in the main protocol stack 320 if not present. To do so, create_fork_if absent should be set to true (else an exception is thrown if FORK is not found), and the neighbor protocol (e.g. FRAG2.class) should be defined. In addition, the position (ProtocolStack.ABOVE/BELOW) relative to the neighbor protocol should be defined.

When a fork channel 304-312 is created, it is passed to the main channel 320 as a reference. The lifetime of a fork channel 304-312 is less than or equal to the lifetime of the main channel 320 on which it piggybacks. When the main channel 320 is closed or disconnected, invoking an operation on the fork channel 304-312 (e.g., sending a message or connecting) throws an exception. The fork-channel 304-312 has the same address, logical name, and view as the main channel 320.

When a fork stack 330, 340 is initialized (e.g., init( ) start( )), the fork stack 330, 340 should be disconnected from the main stack 320, or else the init( ) and/or start( ) method may propagate into the main stack 320 (which could cause problems in some protocols, such as re-initializing themselves again, etc.). As such, in one implementation, a "dummy stub" may be created for initialization and starting of the fork protocol 114 that catches these events and handles them. Note that some protocols grab the timer from the transport protocol (e.g., UDP protocol 120) at init( ) time, so this may be provided by the fork protocol 114 itself.

In one implementation, when a fork channel 304-312 is disconnected or closed, the corresponding events (DISCONNECT, stop( ), destroy( )) cannot be propagated down the main stack 320, as this would close the main-stack 320 as well. Accordingly, such events should be caught similar to the initialization process described above. When a fork channel 304-312 is closed, it is removed from the map in the fork channel's 304-312 associated fork protocol stack 330, 340. In some implementations, when a fork stack 330, 340 is no longer referenced by any fork channels 304-312, it may be removed if it was created programmatically. If the fork stack 330, 340 is configured declaratively, then the fork stack 330, 340 may not be removed.

In one implementation, when a fork stack 330, 340 is created programmatically, not all group members (also referred to herein as "cluster nodes") may have the same fork stacks 330, 340. For example, if a cluster has member nodes{A,B,C} and only B and C create the fork stack with id=2, then COUNTER may not work as all requests go to the coordinator A, and A does not have COUNTER.

To overcome this, implementations of the disclosure may use a declarative configuration, which includes the fork protocol 114 in the main channel's 302 main protocol stack 320, and creates fork stacks 330, 340 with id=1 and id=2. This means that fork stack with id=2 is available on A, B and C, and therefore requests sent to A are processed. Note that A's fork stack with id=2 does not have to have a fork channel 304-312 created on top; as long as the fork stack is created in this situation, COUNTER should work.

A declarative configuration, with stack configuration listed from bottom to top, may appear as follows:

```
<MFC/>
<UFC/>
<FORK>
<fork-stack id="lock">
    <CENTRAL_LOCK num_backups="2" . . . />
</fork-stack>
<fork-stack id="counter">
    <COUNTER bypass_bundling="true" timeout="5000" . . . />
</fork-stack>
</FORK>
<FRAG/>
```

In the above example declarative configuration, a main stack is created with protocols MFC, UFC, FORK, FRAG2 and TOA. Then, two fork stacks are created: one with CENTRAL_LOCK and id=1, and another with COUNTER and id=2. These two fork stacks do not include protocols FRAG2 and TOA. A message with fork-stack id=2 ends in COUNTER (or the corresponding fork channel if fork channel ID is set) and does not pass through FRAG2 and TOA. The application could now create fork-channels over an existing fork stack, or create new fork stacks and fork channels over them as well.

In another implementation, different syntax may be utilized for the declarative configuration, as shown below:

```
<MFC/>
<UFC/>
<FORK config="fork-config.xml" . . . />
<FRAG2/>
<TOA/>
```

In the above example, the fork protocol would be configured through an external XML file, which can then define its own schema.

Figure 4:
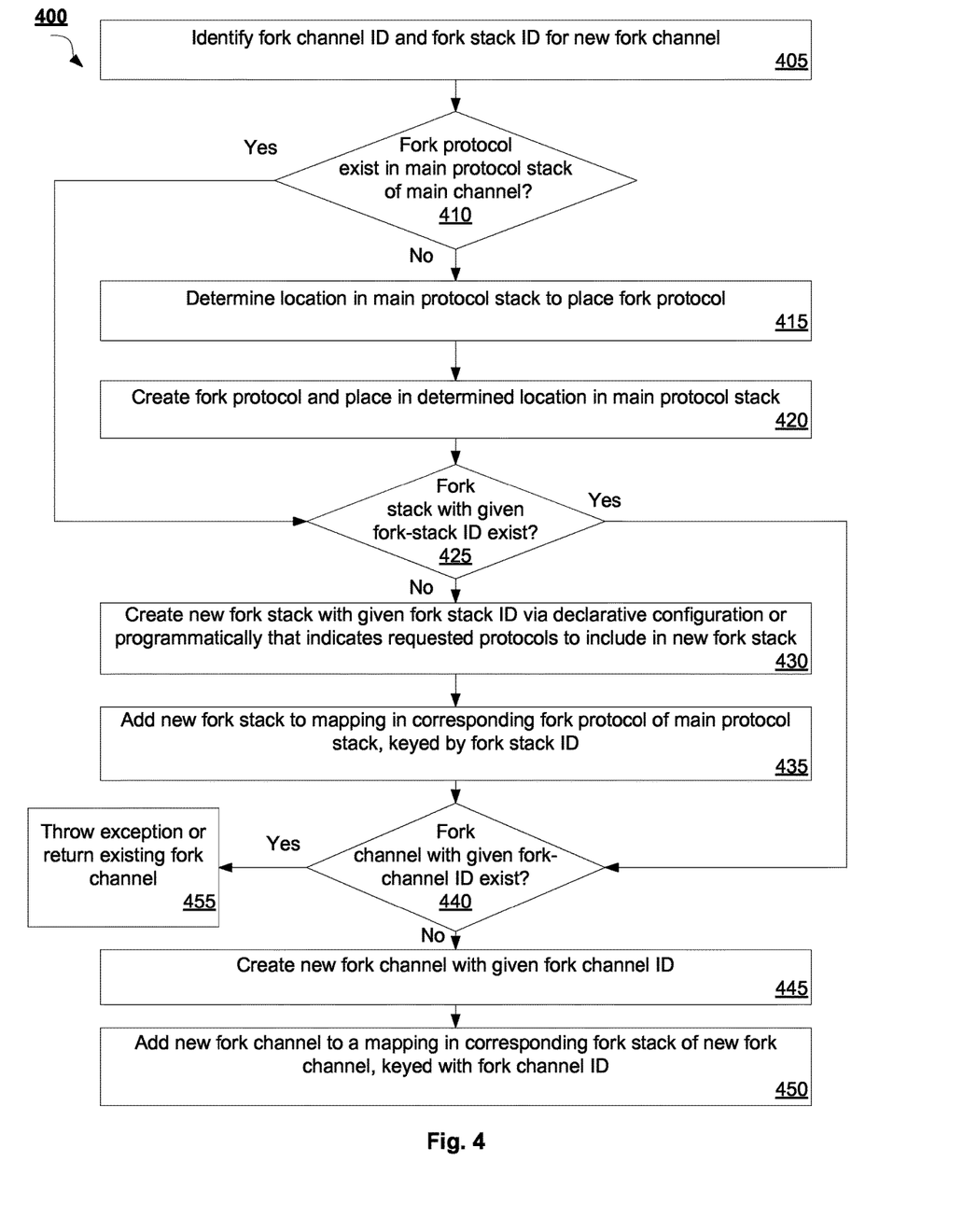
FIG. 4 is a flow diagram illustrating a method for creating a fork channel according to an implementation of the disclosure.

FIG. 4 is a flow diagram illustrating a method 400 for creating a fork channel according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by group communication system 100 of FIG. 1.

Method 400 begins at block 405 where a fork channel ID and fork stack ID for a new fork channel are identified. In one implementation, the new fork channel is requested by an application utilizing a multicast protocol for members of groups. At decision block 410, it is determined whether a fork protocol exists in a main protocol stack of a main channel of the application server. If so, then method 400 proceeds to decision block 425, described further below. On the other hand, if the fork protocol does not exist in the main channel, then method 400 continues to block 415.

At block 415, a location in the main protocol stack to place a fork protocol is determined. Then, at block 420, the fork protocol is created and placed in the determined location in the main protocol stack of the main channel. Method 400 then continues to decision block 425.

At decision block 425, it is determined whether a fork stack exists with the given fork stack ID. If so, then method 400 proceeds to decision block 440, described further below. On the other hand, if a fork stack with the given fork stack ID does not exist, then method 400 continues to block 430. At block 430, a new fork stack is created with the given fork stack ID. In one implementation, the fork stack is created using a declarative configuration. In another implementation, the fork stack is created programmatically. In either case, the creation of the fork stack indicates the protocols, if any, to be included in the fork stack (but not in the main protocol stack of the main channel). Then, at block 435, the new fork stack is added to a mapping in the corresponding fork protocol of the main protocol stack. The mapping is keyed by the fork stack ID.

Subsequently, at decision block 440, it is determined whether a fork channel with the given fork channel ID exists. If so, then method 400 proceeds to block 445 where an exception is thrown or the existing fork channel is returned. On the other hand, if a fork channel with the given fork channel ID does not exist, then method 400 continues to block 445 where a new fork channel with the given fork channel ID is generated. Lastly, at block 450, the new fork channel is added to a mapping in the corresponding fork stack of new fork channel. In one implementation, the fork channel mapping is keyed by the fork channel ID.

Figure 5A:
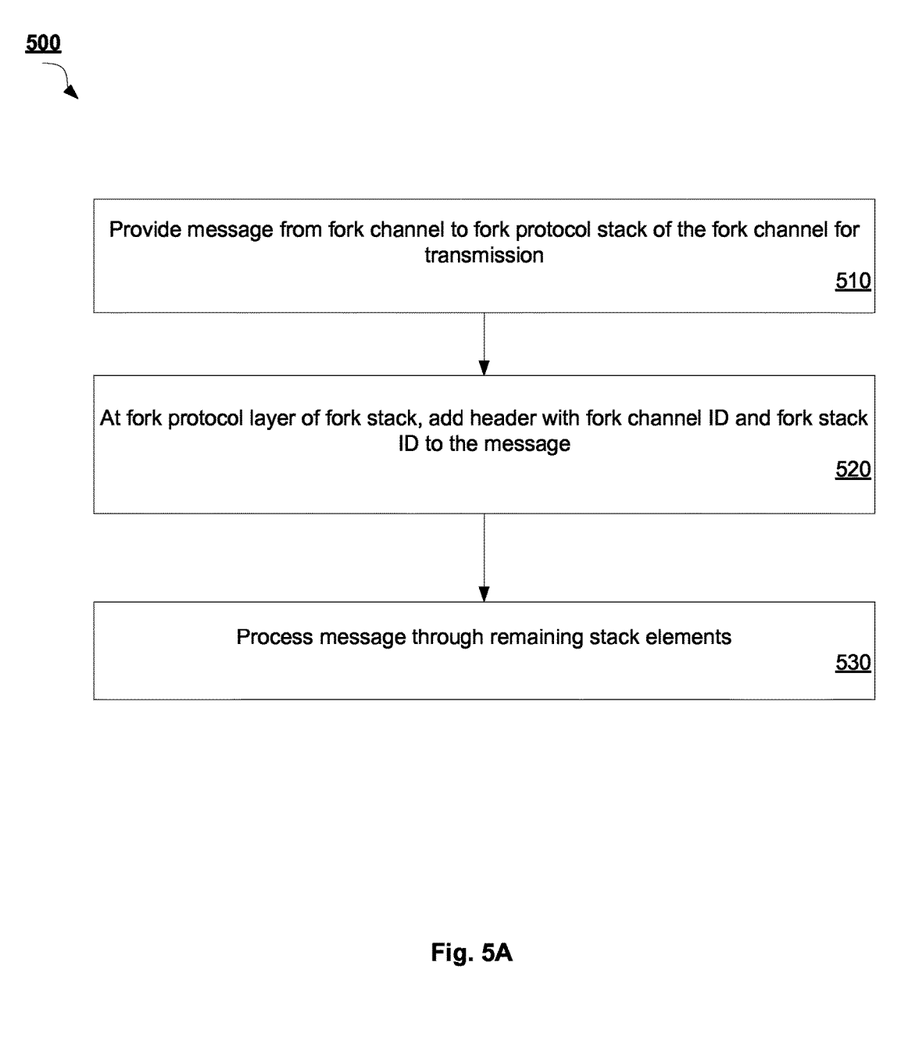
FIG. 5A is a flow diagram illustrating a method for communicating a message from a fork channel according to an implementation of the disclosure.

FIG. 5A is a flow diagram illustrating a method 500 for communicating a message from a fork channel according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by group communication system 100 of FIG. 1.

Method 500 begins at block 510 where a message from a fork channel is provided to the fork protocol stack of the fork channel for transmission. Then, at block 520, when the message reaches the fork protocol layer of the fork stack, a header is added to the message including the fork channel ID and the fork stack ID of the originator of the message. Lastly, at block 530, the message is processed through the remaining stack elements. In one implementation, the remaining stack elements may be the in main channel protocol stack, or may be part of another fork protocol stack that is nested.

Figure 5B:
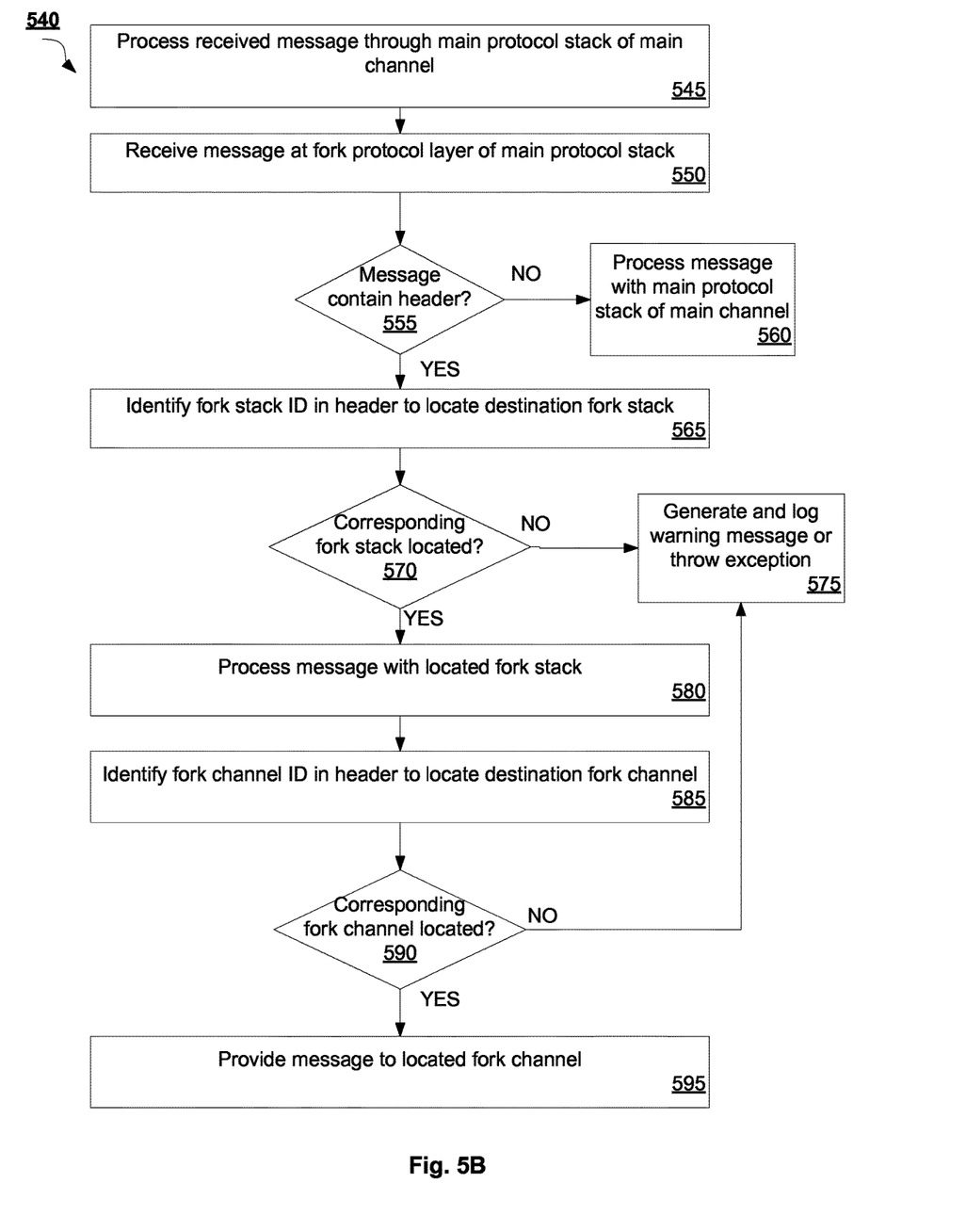
FIG. 5B is a flow diagram illustrating a method for communicating a message to a fork channel according to an implementation of the disclosure.

FIG. 5B is a flow diagram illustrating a method 540 for communicating a message to a fork channel according to an implementation of the disclosure. Method 540 may be performed by processing logic that may comprise hardware (e.g., circuitry, dedicated logic, programmable logic, microcode, etc.), software (such as instructions run on a processing device), firmware, or a combination thereof. In one implementation, method 540 is performed by group communication system 100 of FIG. 1.

Method 540 begins at block 545 where a received message is processed through a main stack of a main channel. Then, at block 550, the message is received at the fork protocol layer of the main protocol stack. At decision block 555, the fork protocol layer of the main protocol stacks determines whether the message contains a header. If not, then at block 560, the message is processed with the main protocol stack of the main channel.

On the other hand, if the message does include a header at decision block 555, method 540 processing to block 565, where a fork stack ID is identified in the header. In one implementation, the identified fork stack ID is used to locate a destination fork stack corresponding to the fork stack ID. A mapping maintained by the fork protocol layer of the main protocol stack may be referenced using the fork stack ID in order to locate the destination fork stack.

At decision block 570, it is determined whether a fork stack corresponding to the fork stack ID in the header of the message is located by the fork protocol layer of the main protocol layer. If not, then, at block 575, a warning message is generated and logged by the system. In other implementations, an exception may be thrown at block 575 instead of generating and logging a warning message. If the corresponding fork stack is located at decision block 570, then method 540 proceeds to block 580 where the message is processed by the located fork stack.

Subsequently, at block 585, a fork channel ID is identified in the header of the message. In one implementation, the identified fork channel ID is used to locate a destination fork channel corresponding to the fork channel ID. A mapping maintained by the fork protocol layer of the fork stack may be referenced using the fork channel ID in order to locate the destination fork channel.

If, at decision block 590, a corresponding fork channel is not located, then method 540 returns to block 575 to generate and log a warning message or throw an exception. On the other hand, if a corresponding fork channel is located at decision block 590, then method 540 proceeds to block 595 to provide the message to the located fork channel.

Figure 6:
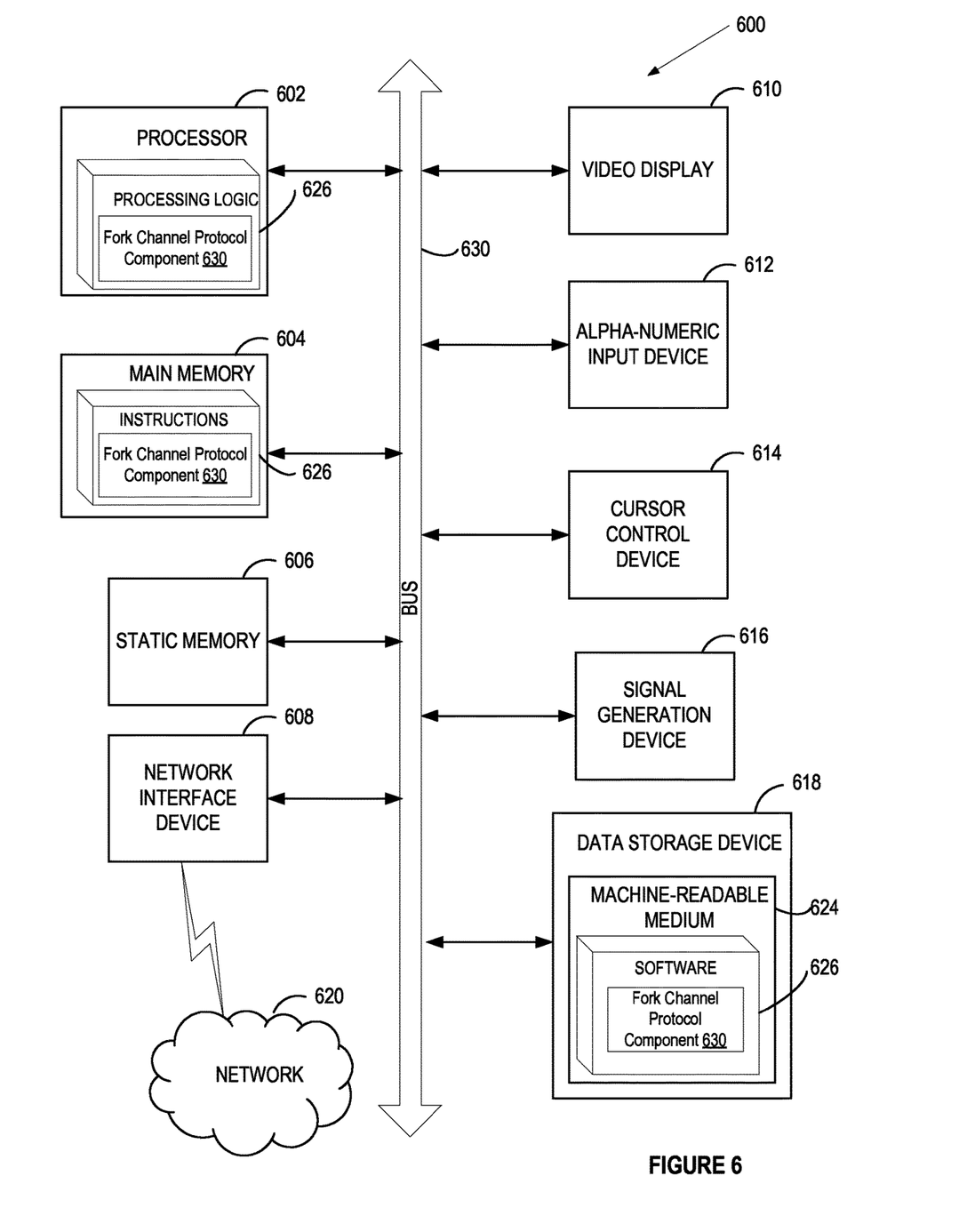
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement a fork channel protocol component 630 to implement light-weight fork channels for groups in a computer system, such as the system described with respect to FIG. 1, and/or a software library containing methods that call the above applications. While the machine-accessible storage medium 628 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "identifying", "processing", "providing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
    receiving, by a processing device, a message at a main channel used for group communication between processes executed by the processing device, the main channel comprising a fork protocol layer;
    identifying a fork channel identifier (ID) and a fork stack ID in a header of the message;
    processing, by the processing device, the message with a first fork stack corresponding to the fork stack ID in the header of the message, the first fork stack comprising a subset of protocols of a main protocol stack of the main channel, the subset of protocols comprising at least a fork protocol of the fork protocol layer; and
    providing the message to a first fork channel corresponding to the fork channel ID, wherein the first fork channel to utilize the first fork stack to separate messages for the first fork channel from the main channel, and wherein the first fork channel and an application programming interface (API) are layered on top of a building block that is layered on top of the main channel;
    wherein the fork protocol layer to:
        implement the first fork stack utilized by the fork channel; and
        implement a second fork stack comprising at least two other protocols that are not part of the main protocol stack of the main channel, wherein the at least two other protocols are not implemented by the first fork stack, and wherein the second fork stack is utilized by a second fork channel to separate messages for the second fork channel from the main channel and the first fork channel.

2. The method of claim 1, further comprising responsive to the message not comprising the header, processing the message with the main protocol stack of the main channel.

3. The method of claim 1, further comprising:
    receiving another message from the first fork channel for transmission; and
    adding the fork channel ID and the fork stack ID to a header of the another message.

4. The method of claim 1, wherein the first fork stack comprises one or more protocols that are not part of the main protocol stack of the main channel.

5. The method of claim 1, wherein the first fork channel is created by a declarative configuration provided by a process using the main channel for group communication.

6. The method of claim 1, further comprising the first fork channel to send the message to the building block layered on top of the main channel.

7. An apparatus, comprising:
    a memory; and
    a processing device communicably coupled to the memory, wherein the processing device to execute instruction to cause the processing device to:
        receive a message at a main channel used for group communication between processes executed by the processing device, the main channel comprising a fork protocol layer;
        identify a fork channel identifier (ID) and a fork stack ID in a header of the message;
        process the message with a first fork stack corresponding to the fork stack ID in the header of the message, the first fork stack comprising a subset of protocols of a main protocol stack of the main channel, the subset of protocols comprising at least a fork protocol of the fork protocol layer; and
        provide the message to a first fork channel corresponding to the fork channel ID, wherein the first fork channel to utilize the first fork stack to separate messages for the first fork channel from the main channel, and wherein the first fork channel and an application programming interface (API) are layered on top of a building block that is layered on to of the main channel;
        wherein the fork protocol layer to:

implement the first fork stack utilized by the fork channel; and implement a second fork stack comprising at least two other protocols that are not part of the main protocol stack of the main channel, wherein the at least two other protocols are not implemented by the first fork stack, and wherein the second fork stack is utilized by a second fork channel to separate messages for the second fork channel from the main channel and the first fork channel.

8. The apparatus of claim 7, wherein the processing device is further to, responsive to the message not comprising the header, process the message with the main protocol stack of the main channel.

9. The apparatus of claim 7, wherein the processing device is further to:
receive another message from the first fork channel for transmission; and
add the fork channel ID and the fork stack ID to a header of the another message.

10. The apparatus of claim 7, wherein the first fork stack comprises one or more protocols that are not part of the main protocol stack of the main channel.

11. The apparatus of claim 7, wherein the first fork channel is created by a declarative configuration provided by a process using the main channel for group communication.

12. The apparatus of claim 7, wherein the processing device is further to send, via the first fork channel, the message to the building block layered on top of the main channel.

13. A non-transitory machine-readable storage medium including instructions that, when accessed by a processing device, cause the processing device to:
receive, by the processing device, a message at a main channel used for group communication between processes executed by the processing device, the main channel comprising a fork protocol layer;
identify a fork channel identifier (ID) and a fork stack ID in a header of the message;
process, by the processing device, the message with a first fork stack corresponding to the fork stack ID in the header of the message, the first fork stack comprising a subset of protocols of a main protocol stack of the main channel, the subset of protocols comprising at least a fork protocol of the fork protocol layer; and
provide the message to a first fork channel corresponding to the fork channel ID, wherein the first fork channel to utilize the first fork stack to separate messages for the first fork channel from the main channel, and wherein the first fork channel and an application programming interface (API) are layered on top of a building block that is layered on top of the main channel;
wherein the fork protocol layer to:
implement the first fork stack utilized by the fork channel; and
implement a second fork stack comprising at least two other protocols that are not part of the main protocol stack of the main channel, wherein the at least two other protocols are not implemented by the first fork stack, and wherein the second fork stack is utilized by a second fork channel to separate messages for the second fork channel from the main channel and the first fork channel.

14. The non-transitory machine-readable storage medium of claim 13, wherein the processing device is further to: responsive to the message not comprising the header, process the message with the main protocol stack of the main channel.

15. The non-transitory machine-readable storage medium of claim 13, wherein the processing device is further to:
receive another message from the first fork channel for transmission; and
add the fork channel ID and the fork stack ID to a header of the another message.

16. The non-transitory machine-readable storage medium of claim 13, wherein the first fork stack comprises one or more protocols that are not part of the main protocol stack of the main channel.

17. The non-transitory machine-readable storage medium of claim 13, wherein the first fork channel is created by a declarative configuration provided by a process using the main channel for group communication.

18. The non-transitory machine-readable storage medium of claim 13, wherein the processing device is further to send, via the first fork channel, the message to the building block layered on top of the main channel.

* * * * *